Figure 1:
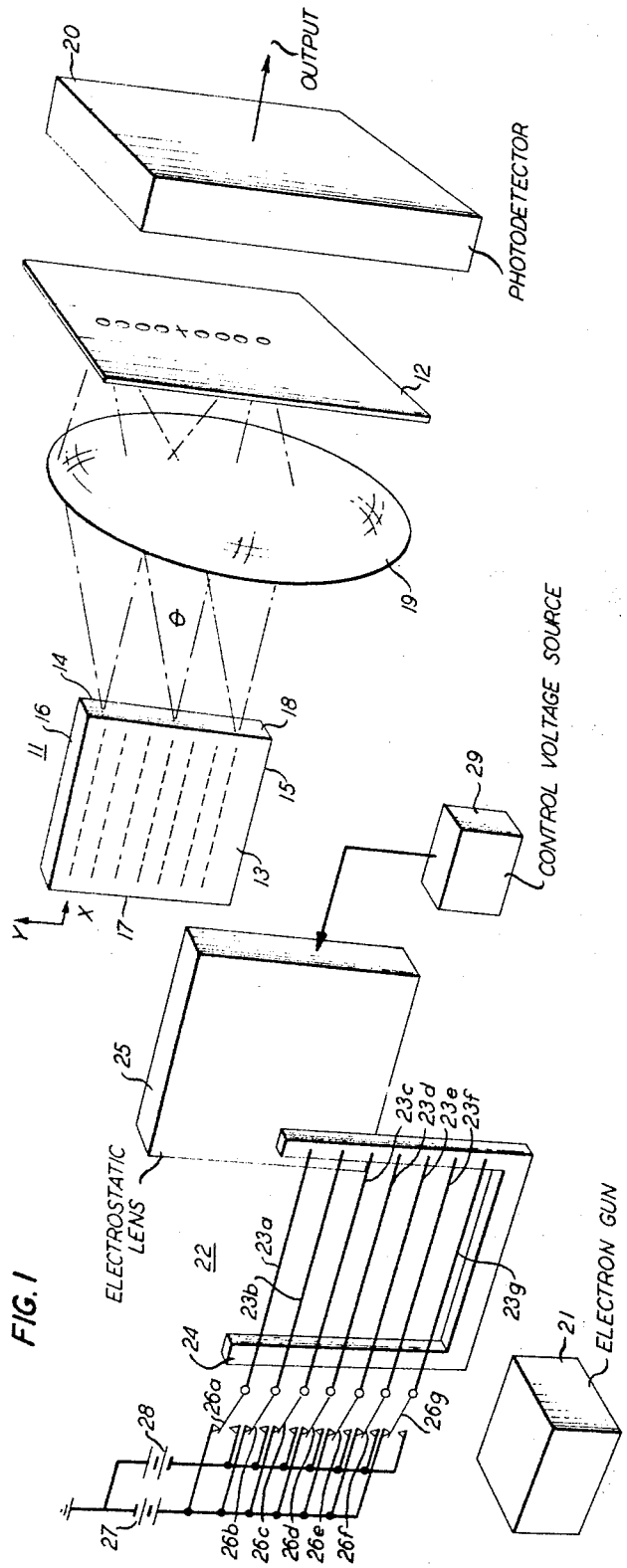

United States Patent Office 3,448,405
Patented June 3, 1969

3,448,405
SCANNING LASER
Peter A. Wolff, Berkeley Heights, N.J., assignor to Bell
Telephone Laboratories, Incorporated, New York,
N.Y., a corporation of New York
Filed Feb. 17, 1966, Ser. No. 528,220
Int. Cl. H01s 3/00
U.S. Cl. 331—94.5     7 Claims This invention relates to the controllable deflection of laser beams.

"Laser" is an acronym for light amplification by stimulated emission of radiation. Light is generally understood to include the infrared and ultraviolet portions, as well as the visible portion, of the electromagnetic spectrum. It has heretofore been recognized that the wavelengths within these portions of the spectrum are sufficiently short that scanning of memory cells, switches and logic devices may be accomplished directly by deflection of a beam of such radiation, rather than through complicated wiring networks.

For example, in the copending application of T. J. Nelson, Ser. No. 239,948, filed Nov. 26, 1962, and assigned to the assignee hereof, there is disclosed an inherently digital apparatus for deflecting a light beam.

Another type of light deflector is that disclosed in the copending application of E. I. Gordon, Ser. No. 377,353, filed June 23, 1964, and assigned to the assignee hereof. Therein is described an efficient diffraction-grating type of deflector capable of deflections at microwave frequencies.

When employed to deflect the beam from a laser, such apparatus is nevertheless separate and distinct from the laser and represents a substantial attenuation between the laser and the utilization apparatus.

On the other hand, in the copending application of A. G. Chynoweth, Ser. No. 329,050, filed Dec. 9, 1963, now Patent No. 3,361,988 and assigned to the assignee hereof, coordinate selection within the laser active material is proposed. Nevertheless, such a scheme fails to make full and effective use of the laser active material. Further, in the copending application of R. J. Collins et al., Ser. No. 256,213, filed Feb. 1, 1963, now Patent No. 3,316,501 and assigned to the assignee hereof, the end and side laser walls are patterned in reflectivity to define a "bouncing ball mode" which can be selectively changed by changing the reflectivity pattern or by changing the pumping power level. Nevertheless, changing reflectivity patterns is cumbersome; and changing power level may not provide sufficiently varied beam deflections for many applications.

My invention overcomes these deficiencies of the prior art by pumping the active material of an injection or semiconductor laser inhomogeneously to provide the greatest gain for a mode propagating at an angle with respect to the normal to the reflective end surfaces. The inhomogeneous pumping provides a population inversion gradient having a plurality of maxima in a plane transverse to the direction of the beam. The angle of deflection is inversely related to the spacing between the maxima and is directly proportional to the wavelength of the light, i.e., $$\theta \approx \frac{\lambda}{2d}$$

as in defraction grating deflectors. A large number of uniformly spaced maxima and minima of population inversion provides improved efficiency and resolution in deflecting the laser beam.

A first species of the invention employs means for pumping the active material with an electronic beam having a density gradient shaped to produce the desired maxima and minima of population inversion. A second species employs charge carrier density waves in the active material which are generated under conditions of appropriate disposition of the pumping field and certain additional electric and magnetic fields. It should be understood that the generic concept includes any other means for inhomogeneously pumping the active medium to produce the required maxima and minima of population inversion therein.

Figure 2:
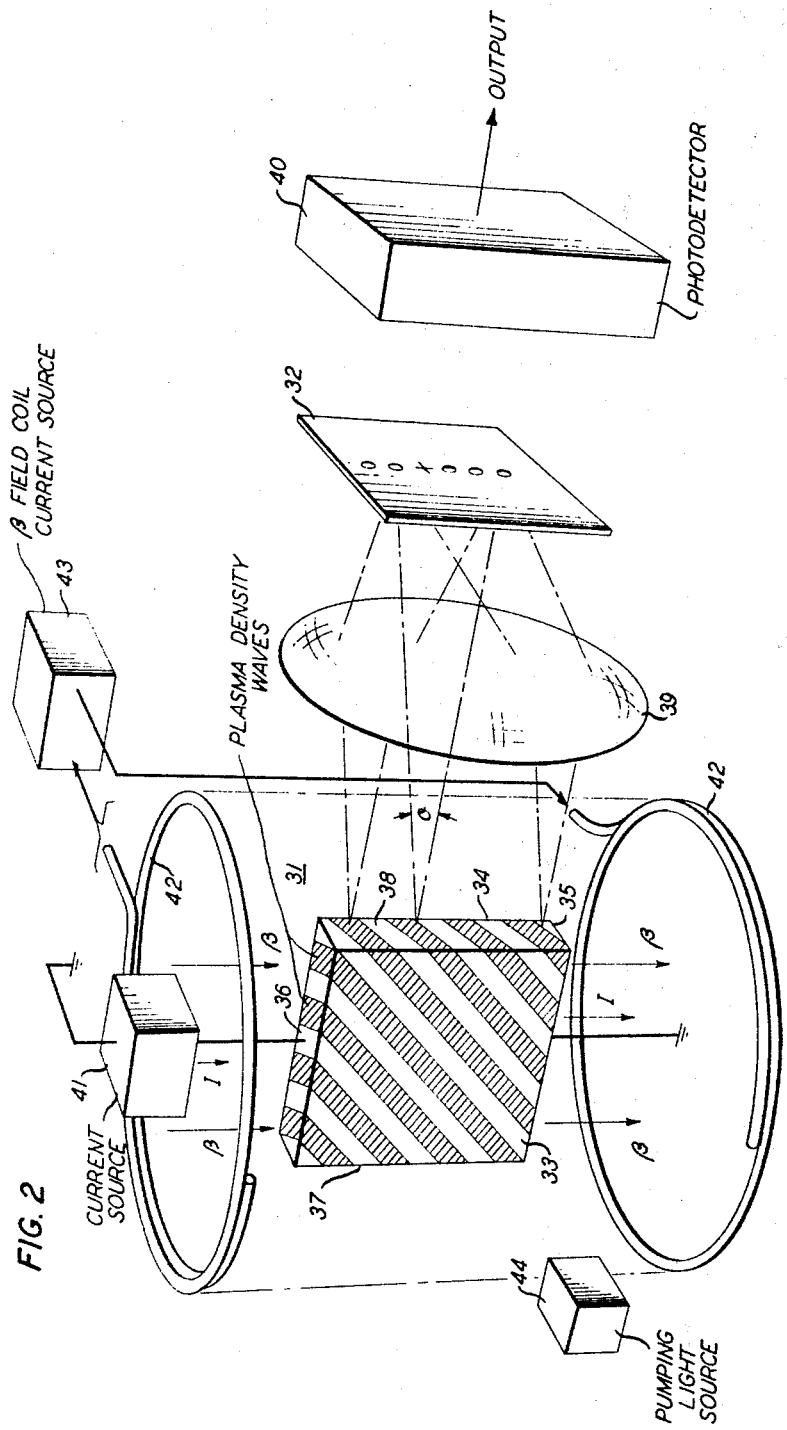

A more complete understanding of my invention may be obtained from the following detailed description and the drawings, in which:

FIG. 1 is a partially pictorial and partially block diagrammatic illustration of a preferred embodiment of the first species of the invention; and FIG. 2 is a partially pictorial and partially block diagrammatic illustration of a preferred embodiment of the second species of the invention.

In FIG. 1, it is desired to deflect the beam from the laser active medium 11 to illuminate any desired region of an information storage matrix including the punched card 12.

The laser active medium 11 is preferably indium antimonide (InSb), although it could also be gallium arsenide (GaAs), indium phosphide (InP), indium arsenide (InAs), tellurium (Te), cadmium sulfide (CdS), lead telluride (PbTe), lead selenide (PbSe) or other direct band-gap semiconductor suitable for being pumped by an electron beam for creation of a population inversion therein. The active medium 11 is in the form of a slab having major surfaces 13 and 14 and the reflective minor surfaces 15, 16, 17 and 18, the latter being partially transmissive. The major surfaces 13 and 14 and minor surfaces 15 and 16 are parallel to a central axis extending through a lens 19, the punched card 12 and the photodetector 20; and the minor surfaces 17 and 18 are orthogonal to that central axis.

An electron gun 21 directs a broad electron beam upon the major surfaces 13 of slab 11. The beam passes through a grid 22 of parallel horizontal electrodes 23a–23g, stretched between and supported by the vertical dielectric supports 24. Thereafter, the electron beam passes through the electrostatic lens 25.

The single-pole double-throw switches 26a–26g each have one contact connected to positive potential source 27 and another contact connected to negative potential source 28. The poles of switches 26a–26g are connected to electrodes 23a–23g, respectively. The dielectric supports 24 provide negligible capacitance with respect to ground for each of the electrodes 23a–23g, so that very little current flows in the electrodes as their potentials change in response to switching of the switches connected thereto.

Electron gun 21 may be of the type conventional in the television tube art, but is adjusted so that the beam is defocused to become a broad beam encompassing electrodes 23a–23g.

Electrostatic lens 25 may also be of the type conventional in the television tube art and may be adjusted by control voltage source 29 to focus or defocus the beam.

The lens 19 is disposed to concentrate the broad beam provided by laser active medium 11 and to focus it upon an area of desired size in the card 12. If that area is the location of a punched hole in card 12, the beam passes through; and the photodetector 20 is disposed to intercept the beam, regardless of which hole it passes through. On the other hand, there may be no hole at the position the deflected beam strikes; and the photodetector 20 will not respond to the beam. Information is stored by the selective punching of holes in card 12.

To understand the operation of this embodiment, assume that switches 26a–26g connect electrodes 23a–23g all to source 27 as shown in FIG. 1. Upon passing through the grid 22 formed by the electrodes, the broad electron beam has a ripple structure imposed on it, the ripple or variation occurring in the vertical dimension. The ripple occurs because electrons passing near a positive electrode tend to be bunched in a line that is a projection of that electrode. Similarly, if some electrodes were connected by the switches to negative source 28, the electrons passing near and on either side of them would tend to be separated.

When bunched electrons strike the slab 11, a maximum of population inversion is produced. The intervening minima of population inversion may correspond to projections of negative electrodes; or, if there are no negative electrodes they will simply occur between the maxima.

The spacing of the maxima and minima depends not only upon the electrode spacing and which potentials are connected thereto, but also upon the variable focusing or defocusing action provided by the electrostatic lens 25. Lens 25 provides a wide range of control over the spacing of the maxima of population inversion.

The effect employed to steer the laser beam may be explained by the following analysis. Consider, for simplicity, the electromagnetic modes whose E-field lies in the plane defined by the relatively long dimensions of the crystal 11. This assumption is made for convenience and is not essential. A like analysis and results may be obtained for modes polarized perpendicular to that plane. For modes polarized in that plane, which may be called the $x$–$y$ plane, electric field variations can be expressed generally as follows:

$$E_x \approx \left(\frac{n_2\pi}{l_2}\right) \cos\left(\frac{n_1\pi x}{l_1}\right) \sin\left(\frac{n_2\pi y}{l_2}\right) f(z) \qquad (1)$$

$$E_y \approx -\left(\frac{n_1\pi}{l_1}\right) \sin\left(\frac{n_1\pi x}{l_1}\right) \cos\left(\frac{n_2\pi y}{l_2}\right) f(z) \qquad (2)$$

$$E_z = 0 \qquad (3)$$

where $n_1$ and $n_2$ are integers, $l_1$ and $l_2$ are the widths of the crystal 11 in the $x$ and $y$ directions, respectively, and $f(z)$ is a solution of the one-dimensional wave equation. In most semiconductor lasers, $f(z)$ is a slowly varying function of position. The mode orders $n_1$ and $n_2$ are related to the wave vector, $k$, of the laser light inside the crystal by the relation $$\left(\frac{n_1\pi}{l_1}\right)^2 + \left(\frac{n_2\pi}{l_2}\right)^2 \approx k^2 = \frac{\omega^2}{c^2\epsilon} \qquad (4)$$

where $\omega$ is the laser frequency $c$ is the velocity of light, and $\epsilon$ is the dielectric constant of the crystal, all in appropriate units.

Because of the high reflectivity of surfaces 35–38 of laser active medium 11, the modes which normally oscillate in response to uniform pumping are those which propagate in the normal direction with respect to surfaces 17 and 18, which have a greater separation than surfaces 15 and 16. These modes are described by the relationships $$\left(\frac{n_1\pi}{l_1}\right) \approx k \qquad (5)$$

and $$n_2 \approx 1 \qquad (6)$$

For the usual crystal size, these relations imply $n_1 \gg n_2$. If the laser is pumped uniformly, it will naturally oscillate in a mode of this type.

In contrast, according to the present invention, a periodic population inversion $I(r)$ is produced in the laser active medium 11. The grid elements 23a–23g, by concentrating the pumping electrons in long thin strips, make the population inversion $I(r)$ a function of position of the following form:

$$I(r) = [I_0 + I_1 \cos(\Phi y)] g(z) \qquad (7)$$

where $\Phi$ is a constant.

The gain is given approximately by the integral $$G \text{ (gain)} \approx \int E^2(r) I(r) d^3r \qquad (8)$$

which, for $n_1 \gg n_2$, can be rewritten as $$G \approx \frac{l_1 C}{2}\left[\frac{I_0 l_2}{2} + I_1 \int_0^1 \cos^2\left(\frac{n_2\pi y}{l_2}\right) \cos(\Phi y) dy\right] \qquad (9)$$

where $$C = \int f^2(z) g(z) dz \qquad (10)$$

It can be shown that the second term in Equation 9 has a maximum (which is sharp if $\Phi l_2 \gg 1$) when $$\Phi \approx \frac{2n_2\pi}{l_2}$$

Thus, the presence of a spatially varying population inversion of the type described by Equation 7 tends to make the laser operate in a mode with $$\left(\frac{n_2\pi}{l_2}\right) \approx \frac{\Phi}{2}$$

Although the Q, or resonance, of the active medium 11 for this mode may be slightly smaller than the Q for a mode propagating normal to surfaces 17 and 18, the increased gain implied by Equation 9 will force the laster to operate in the mode with $$\frac{n_2\pi}{l_2} \approx \frac{\Phi}{2}$$

This mode includes two beams or waves propagating at angles $$\theta \approx \pm \frac{\Phi}{2k}$$

with respect to the $x$-axis.

Accordingly, the net effect of the inhomogeneous pumping is to split the beam and tilt the directions of the resulting beams through angles $\theta$, of opposite sign, with respect to the laser ($x$) axis.

The operation just described differs from that described in the copending patent application of R. J. Collins et al., Ser. No. 256,213, filed Feb. 1, 1963, and assigned to the assignee hereof, in the following respects. In that application, it is taught that a selected one of a plurality of "bouncing ball modes" may be caused to oscillate in a laser by varying the spatial distribution of losses in the optical structure, i.e., the reflectivity pattern of the walls, or "by varying the volume distribution of atoms or molecules in the various energy states," i.e., by varying the power level of uniform pumping in the presence of laser surfaces having a fixed pattern of reflectivity. Nevertheless, that technique is suitable only for a few large deflections and cannot provide continuous or finely incremented deflections.

From Equation 8, above, it is seen that the gain for a mode of interest for the present invention is related to the product of the square of the electric field intensity of that mode at a particular position and the population inversion at that position. An off-axis mode will have a plurality of electric field maxima in a plane transverse to its direction of propagation. It may be intuitively understood that, if we make the maxima of population inversion coincide with the maxima of electric field intensity characteristic of that mode, then we will be successful in exciting that mode while excluding others. The least deflection of the laser beam is provided with two transverse maxima of population inversion, while a deflection as large as that for a "bouncing ball mode" requires an extremely large number of discrete maxima, if the technique of the present invention is used.

Thus, the technique of Giordmaine et al. and the technique of the present invention operate, generally, in different ranges of deflection and have quite different characteristics.

The angle of deflection of the coherent radiation beam from crystal 11 is $$\theta \doteq \frac{\lambda}{2d} \qquad (11)$$

where $\lambda$ is the wavelength of the laser radiation within the active medium and $d$ is the spacing between the maxima of population inversion.

Hence, the angle of beam deflection can be changed by changing the spacing of successive maxima of population inversion. The variation can be continuous, if controlled by the focusing action of electrostatic lens 25, or can be discrete, if controlled by the settings of switches 26a–26g.

As stated above, each off-axis oscillating mode in general, has two output beams, symmetrically deflected with respect to the axis. One or both of these beams may be used for scanning of the output matrix, i.e., card 12.

Assume, for example, that electrostatic lens 47 defocuses the beam so that only two maxima of electron density are incident upon laser active medium 11. The maxima of population inversion have a corresponding spacing. Assume further that the upper light beam, as focused by lens 19, passes through the lowest hole in punched card 12. This hole corresponds to a very small angle $\theta$ of deflection with respect to the normal to surfaces 17 and 18. The lower beam is not shown.

Assume now that the focusing action of lens 25 is changed so that the spacing of the maxima of electron density and the spacing of the maxima of population inversion decrease. As a result, the angle of deflection $\theta$, with respect to the normal to surfaces 17 and 18, increases; and the upper focused beam moves upward along the line of holes in punched card 12 and is detected by photodetector 20. Correspondingly, the lower focused beam (not shown) moves downward along the same line and may illuminate still other positions, or holes, (not shown) in card 12. Another photodetector separate from photodetector 20 could detect the beam passed through the second set of holes. Such an arrangement of the information storage apparatus provides parallel read-out.

Alternatively, the upper focused beam can be moved in discrete steps up punched card 12 by energizing electrodes 23a–23g in the following sequence: first, electrodes 23a and 23g; second, electrodes 23a, 23d and 23g; third, 23a, 23c, 23e and 23g; fourth, all electrodes as shown. In each case specified, the energized electrodes are connected to the source of positive potential 27. If desired, the intervening electrodes in each case can be connected to the source of negative potential 28 to define more sharply the minima of population inversion.

It will be noted that an effort is made to maintain an equal spacing of the maxima of population inversion in order to obtain a sharply defined deflected beam. Departures from equal spacing will tend to make fuzzy the edges of the beam and the edges of the spot to which it is focused.

For horizontal deflection instead of vertical deflection, the entire apparatus depicted in FIG. 1 should be rotated in space by 90° about an axis through the active medium 11 and the lens 19.

For deflection in two coordinate dimensions, a prior art type of deflector may be cascaded between the laser active medium 11 and the lens 19 and oriented to provide deflection in a direction orthogonal to that provided by the laser active medium 44 and its pumping apparatus. An alternative method of two-coordinate deflection will be described hereinafter.

Another embodiment of the invention is shown in FIG. 2. In this embodiment, the means for inhomogeneously pumping the laser active medium includes means for generating plasma density waves in the laser active medium.

The generation of plasma density waves in semiconductor materials such as InSb has been reported, for example, in the article by Minoru Toda in the Japanese Journal of Applied Physics, vol. 2, Dec. 1963, at p. 776 and in the articles by Gurevich and Ioffe in Soviet Physics—Solid State, vol. 4, pp. 1938 forward and 2173 forward (1963) and vol. 5, p. 1954 forward (1964).

I have recognized that this effect can occur simultaneously with lasing action in a suitable semiconductor and can produce laser beam deflection according to the present invention. That is, with the provision of suitable pumping means, the maxima of population inversion occur at the maxima of the plasma density waves and produce a deflected laser beam output in a manner similar to that described above in connection with FIG. 1.

More specifically, in FIG. 2, the laser active medium is the semiconductor slab 31, preferably an indium antimonide (InSb) single crystal lightly doped, i.e., with an impurity density approximately equal to $1 \times 10^{14}$ parts per cubic centimeter. The slab 31 has a reflective face 37 and an opposed partially transmissive reflective face 38. Faces 37 and 38 are tilted slightly from a normal position with respect to a central axis through lens 39, punched card 32 and photodetector 40 in order to utilize one of the two output beams. The broad major faces of slab 31 lie parallel to that axis.

Attached to the remaining surfaces 35 and 36 of slab 31 are connections for supplying current from current source 41. The two halves 42 of a Helmholtz coil are disposed beyond these connections in an orientation to supply a magnetic field parallel to the direction of current flow from source 41. The two halves 42 of the Helmholtz coil are connected in series or in parallel and are energized from a source 43. The coil radius is equal to the spacing between the two halves 42.

Pumping light source 44 is illustratively a gallium arsenide (GaAs) injection diode and provides uniform illumination of one major face of slab 31 at a wavelength of 0.8µ, which is appropriate for producing a population inversion between energy levels corresponding to the usual laser transition in InSb.

In operation, despite the uniformity of the pumping light and of the applied magnetic field, the pumping is still inhomogeneous in that an inhomogeneous population inversion conforming to the plasma density waves, is produced. A relatively large plasma or charge carrier density in slab 31 is produced near the surface struck by the pumping light. A plasma gradient lies in a direction normal to that surface. So long as the magnetic field direction intersects, i.e., is not parallel to, the direction of the plasma variation or gradient, instabilities arise in the plasma; and the density waves assume a spacing and propagation speed that is related to the magnitudes of the current and the applied magnetic field.

It will be noted that maxima of population inversion appear diagonally across the partially transmissive reflecting surface 38 of slab 31. Nevertheless, the laser beam will, in most cases, be deflected in a vertical direction. The greater pathlength and effective volume of the active medium 31 for such an off-axis mode make its oscillation threshold lower than the oscillation threshold for a mode propagating obliquely to the major surfaces.

Further, in the embodiment of FIG. 2 as described above, the plasma density waves are preferably standing waves; and so are the variations of population inversion. For this purpose, the length of slab 31 between the connections from current source 41 is made an integral multiple of the desired spacing of the maxima, the surfaces to which the connections are made are polished to provide a high reflectivity for the plasma waves, and the magnetic field and the applied current from source 41 are adjusted to values appropriate for that spacing of maxima.

With either running or standing plasma waves, a fixed angle of deflection of the laser beam is obtained. The angle is inversely related to the spacing of the maxima of population inversion. In order to provide a continuously varying deflection of the laser beam, i.e., scanning by the laser beam, the magnitude of current from source 41 or from the magnetic field-producing source 43, or from both, may be continuously varied. This variation varies the frequency and wavelength of the plasma waves and hence, the spacing of their maxima and the maxima of population inversion.

The angle $\theta$ of deflection is inversely related to the spacing of the maxima of population inversion, as explained above in connection with the embodiment of FIG. 1.

The embodiment of FIG. 2 may be modified by cascading a prior art type of light deflector, for example that described in the above-cited copending application of E. I. Gordon, between the laser active medium and lens 39 to provide the horizontal deflection. Further, it is possible to pump the laser active medium by some means other than a pumping light beam, i.e., a uniform beam of pumping electrons, while still employing the plasma density waves to produce the nonuniform population inversion. Still further, the direction of current flow need not be parallel to the magnetic field direction in order to generate the plasma density waves; for example, see the above-cited article by Toda. The basic requirement for plasma density waves is that the magnetic field direction intersect, i.e., be nonparallel to, the direction along which a plasma gradient is produced. The specifically illustrated embodiment of FIG. 2 has a pumping radiation direction, a current direction and a magnetic field direction; one of the three directions must intersect the other two.

It should be understood that other semiconductor materials may be substituted for indium antimonide in the embodiment of FIG. 2. These may include, for example, lead telluride (PbTe), lead selenide (PbSe), indium arsenide (InAs), gallium arsenide (GaAs), and indium phosphide (InP).

It is also possible to pump a junction laser inhomogeneously according to the present invention by providing multiple strip electrodes overlying the most closely spaced desired locations of maxima of population inversion and energizing these electrodes simultaneously in the manner of grid electrodes 23a–23g in FIG. 1.

A further modification of the present invention involves the use of two-photon pumping to enable deflection of the laser beam in two coordinates simultaneously.

Two-photo homogeneous pumping is described by N. G. Bosov et al., JETP Leters (a Russian journal) 1, 118 May 15, 1965. A distinct advantage of such pumping is that the laser active medium may be naturally highly transparent to it, so that a very deep penetration of the population inversion is achieved. With such a deep penetration of the population inversion, inhomogeneous pumping according to my invention can be achieved in two orthogonal coordinates by employing two pumping sources directing radiation upon orthogonal faces of the active medium and each focused in a pattern to generate a plurality, or set, of maxima of population inversion in the active medium. The maxima within each set lie in parallel planes. The two sets of maxima of population inversion are mutually orthogonal; and, in any plane transverse to the resonator axis, intersecting portions of the two sets exists. The two sets enable deflection of the output laser radiation in two orthogonal directions. For example, suitable active media for this embodiment of the invention would be indium antimonide or lead telluride and suitable pumping radiation sources in either case would be high-powered carbon dioxide lasers of the type disclosed in the copending patent application of C. K. N. Patel, Ser. No. 495,844, filed Oct. 14, 1965, and assigned to the assignee hereof.

In all cases, the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. Apparatus comprising a body of semiconductor material providing therein upper and lower energy levels appropriate for the stimulated emission of radiation, said body having a preferred surface through which said radiation is emitted, and means for pumping said body inhomogeneously to produce between said levels a population inversion varying through at least two maxima and a minimum therebetween in a plane transverse to the normal to said preferred surface.

2. Apparatus according to claim 1 in which the pumping means includes a source of an electron beam directed toward said active region and means for imposing a ripple structure upon a cross section of said beam to produce the maxima of population inversion.

3. Apparatus according to claim 2 in which the means for imposing a ripple structure includes a grip of parallel electrodes cascaded after the beam source, and means for selectively energizing said electrodes 4. Apparatus according to claim 3 including an electrostatic lens cascaded between the grid and the active region.

5. Apparatus according to claim 1 in which the pumping means includes means for generating plasma density waves in the semiconductor body, said generating means comprising means for creating a plasma density gradient and means for applying a magnetic field in a direction intersecting the direction of said gradient.

6. Apparatus according to claim 5 in which the means for creating a plasma density gradient includes a source of pumping light, the density wave generating means also including connections for flowing a current through the semiconductor body.

7. Apparatus according to claim 1 in which the pumping means includes a source of pumping light applied to said body in a first direction with wavelength appropriate to excite selectively the upper energy level in said body, connections for flowing current in a second direction through said body, and means for applying an independent magnetic field to said body in a third direction, one of said first, second and third directions intersecting the other two.

References Cited
UNITED STATES PATENTS
3,316,501　4/1967　Collins et al. _____ 331—94.5

JOHN KOMINSKI, *Primary Examiner.*

U.S. Cl. X.R.

350—160